Feb. 3, 1948. P. F. ADRIAN 2,435,263
INTERNAL MICROMETER GAUGE
Filed March 25, 1944
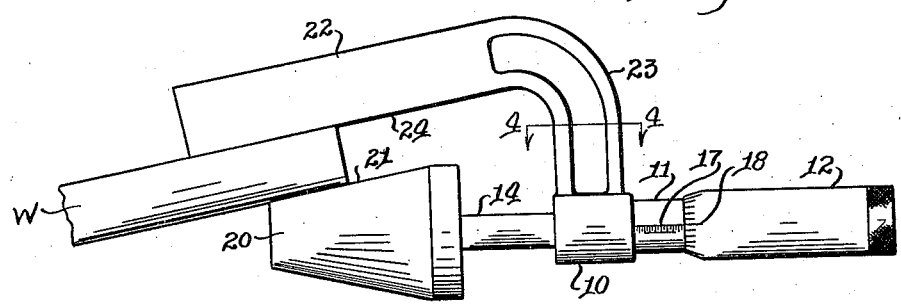
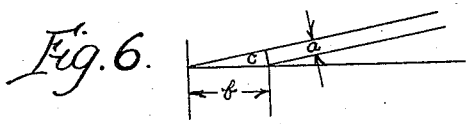
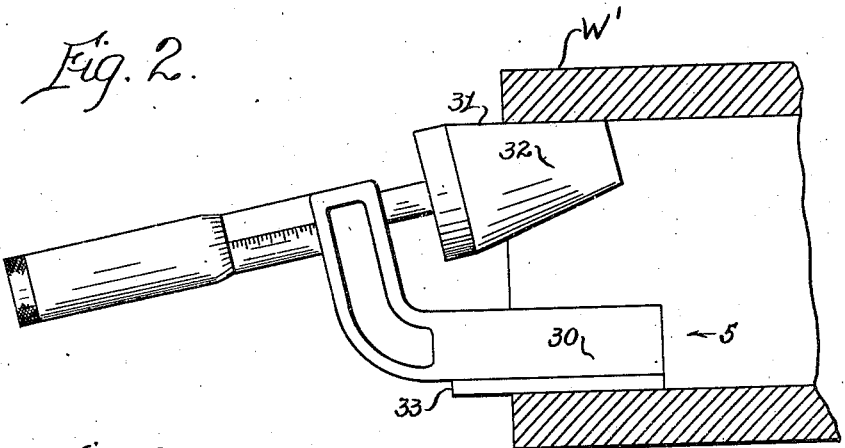
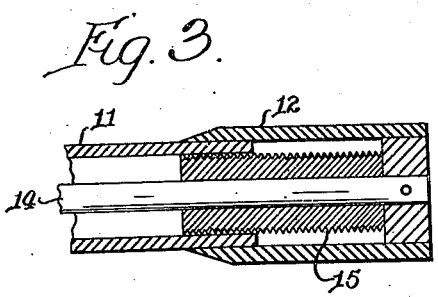
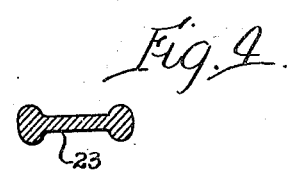
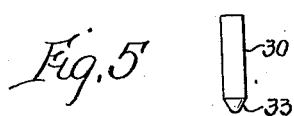
INVENTOR.
Paul F. Adrian.
BY ATTORNEY.
Chas. T. Hawley Patented Feb. 3, 1948

2,435,263

UNITED STATES PATENT OFFICE 2,435,263

INTERNAL MICROMETER GAUGE

Paul F. Adrian, Worcester, Mass.

Application March 25, 1944, Serial No. 528,071

2 Claims. (Cl. 33—164)

This invention relates to devices which are used to accurately determine work diameters or other similar dimensions.

It is the general object of my invention to provide a measuring device by which exceptionally close readings may be obtained. More specifically, I provide a measuring device in which the change in the measured dimension is related to the axial displacement of the movable measuring element in a constant proportion equal to the sine of the angle between the axis of movement of said movable measuring element and the longitudinal surface of the fixed work-engaging reference element of said measuring device.

In the preferred forms of my invention, the measured dimension is the distance between a longitudinal surface element of an axially adjustable cone and a gauge bar fixed in such a position that it is parallel to the line of contact of the cone with the work to be measured.

My invention further relates to arrangements and combinations of parts which will be hereinafter described and more particularly pointed out in the appended claims.

Two forms of my invention are shown in the drawings, in which

Fig. 1 is a front elevation of my invention as adapted for external measurements;

Fig. 2 is a front elevation of my invention as adapted for internal measurements;

Fig. 3 is a sectional elevation of the handle portion of my improved measuring device;

Fig. 4 is a detail sectional view, taken along the line 4—4 in Fig. 1;

Fig. 5 is a detail end elevation, looking in the direction of the arrow 5 in Fig. 2; and Fig. 6 is a diagram illustrating the mathematical relation by which measurements are ascertained by my improved device.

In Fig. 1 my improved external measuring device comprises a frame 10 having a sleeve 11 fixed thereto and extending within an outer sleeve 12 to which is secured a plunger 14 and a threaded plug 15. The plug 15 engages internal screw threads in the fixed sleeve 11. Obviously, as the sleeve 12 is rotated, the plunger 14 will be moved to the right or to the left in Fig. 1, according to the direction of rotation of the sleeve 12 and plug 15. The axial position of the plunger may be read by referring to graduations 17 on the fixed sleeve 11 and graduations 18 on the rotatable sleeve 12, the construction thus far described being illustrative only and corresponding in general to similar parts in micrometers in a commercial use.

For the purposes of my invention, I affix a cone 20 to the end of the plunger 14, which cone rotates with the plunger and is accurately concentric therewith. I have also connected a gauge bar 22 by an arm 23 to the fixed frame 10, with its inner or gauging surface 24 accurately parallel to the most closely adjacent element 21 of the peripheral surface of the cone 20.

The arm 23 may have the channel section shown in Fig. 4 to provide increased stiffness for a given weight of metal.

In the use of my improved measuring device, the work W is inserted between the surface 24 of the gauge bar 22 and the element 21 of the cone 20. The cone is then advanced or moved to the left in Fig. 1 until it contacts the work W, the work also being in contact with the surface 24. The thickness or diameter of the work may then be accurately read by reference to the graduations 17 and 18, as with the usual micrometer.

It will be evident, however, that measurements may be made much finer or closer than with the usual direct endwise contact of the plunger 14. This is demonstrated in Fig. 6, where it appears that the small change in diameter or thickness indicated by $a$ requires a substantial longitudinal movement of the cone 20 as indicated by $b$.

If $c$ is the half-angle of the cone $$\frac{a}{b}$$

will equal sin $c$, or $a = b \sin c$.

If the angle $c$ is chosen as approximately 11° 33' as shown in the drawing, sin $c = 0.200$. One of the graduations 18 will then indicate ⅕ of the change in diameter which would be indicated by similar graduations in the usual direct or end contact type of micrometer.

The graduations 18 which commonly indicate thousandths of an inch will now indicate .0002" for each graduation. As the graduations may easily be subdivided in reading, my improved device will accurately indicate tenths of thousandths of an inch or less.

In Fig. 2 I have shown a measuring device all parts of which may be identical with those shown and described in Figs. 1 and 3, with the exception that the gauge bar 30 is parallel to the remote surface elements 31 of the cone 32, instead of being parallel with the adjacent element. A contact piece 33 having a curved outer edge is fixed on the outside of the gauge bar 30.

With this construction, the internal diameter of a piece of cylindrical work W' may be accurately measured and the fineness or closeness of indication will be the same as with the external form previously described.

Having thus described my invention and the advantages thereof, I do not wish to be limited to the details herein disclosed, otherwise than as set forth in the claims, but what I claim is:

1. An internal measuring device comprising a frame, a plunger threaded in said frame and axially adjustable by rotation relative thereto, a cone mounted on the free end of said plunger and concentric therewith, and a gauge bar fixed on said frame and parallel to the most remote longitudinal surface element of said cone.

2. An internal measuring device comprising a frame, a plunger threaded in said frame and axially adjustable by rotation relative thereto, a cone mounted on the free end of said plunger and concentric therewith and engaging a cylindrical inner surface of a work piece along a longitudinal surface element of said cone, and a reference gauge member secured on said frame and engaging said cylindrical inner surface of said work piece diametrically opposite said longitudinal line of cone surface engagement.

PAUL F. ADRIAN.

REFERENCES CITED

The following references are of record in the file of this patent:

UNITED STATES PATENTS

| Number | Name | Date |
|---|---|---|
| 386,469 | Howard | July 24, 1888 |
| 1,074,552 | Kline | Sept. 20, 1913 |
| 1,715,405 | Bull | June 4, 1929 |

FOREIGN PATENTS

| Number | Country | Date |
|---|---|---|
| 527,663 | Great Britain | 1940 |